Figure 1:
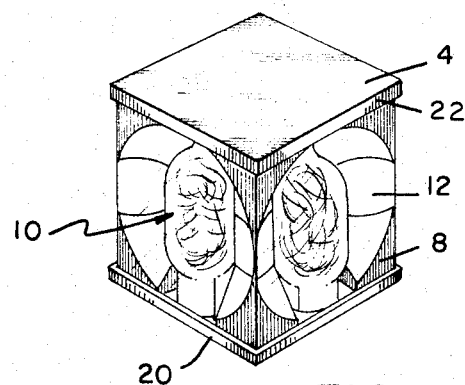

July 9, 1968

W. C. FINK ET AL 3,392,273

PHOTOGRAPHIC FLASHLAMP UNIT

Filed May 19, 1966

WILLIAM C. FINK
DONALD W. HARTMAN
JOHN W. SHAFFER
*INVENTORS*

BY *Joseph C. Ryan*
ATTORNEY

United States Patent Office 3,392,273
Patented July 9, 1968

3,392,273
PHOTOGRAPHIC FLASHLAMP UNIT
William C. Fink, Williamsport, Donald W. Hartman, Warrensville, and John W. Shaffer, Montoursville, Pa., assignors to Sylvania Electric Products Inc., a corporation of Delaware
Filed May 19, 1966, Ser. No. 551,300
8 Claims. (Cl. 240—1.3)

This invention relates to the manufacture of photoflash lamps and more particularly to the packaging of a plurality of photoflash lamps in a unitary structure designed and adapted to be mounted on and used with a camera.

A unit of this type is disclosed in U.S. Patent 3,244,087 which issued on Apr. 5, 1966, to Lester F. Anderson et al. and is usually identified commercially as a "Flashcube." In one modification, a flashcube comprises a plurality of flashlamps mounted on a base member, each lamp having its own reflector, and the lamp-reflector assemblies being arranged inside a container having a transparent side serving as a window for each of said lamps.

Generally speaking, the commercial flashcube comprises a polystyrene base on which a plurality of lamp-reflector assemblies are mounted and a molded polystyrene box enclosing said assemblies and being ultrasonically sealed to said base to thus define the photographic flashlamp unit. The flashlamps are subminiature in size, having less than about 1 cc. internal volume. These lamps are filled with a combustion-supporting gas such as oxygen at about 9 atmospheres pressure and a combustible such as filamentary zirconium. The outside of these lamps is provided with a 7-10 mils thick cellulose acetate coating to contain the combustion of the zirconium metal shreds. The temperature reached during combustion is well above the melting point of $ZrO_2$, which is about 3000° K.

Containment of the combustion is a fundamental requirement of flashlamp and flashcube construction. One of the principal objects of this invention to improve the containment qualities of flashcubes.

This and other objects, advantages and features are attained in accordance with the principles of this invention by using box materials characterized by greater strength and greater heat resistance than those used heretofore, while still maintaining a high degree of transparency or clarity, ease of manufacture and low cost. Materials found to be far superior to polystyrene are cellulose propionate, cellulose acetate, or other cellulosic polymers like cellulose butyrate. Other usable polymers may be polycarbonate or other clear plastic materials which can be molded or extruded and have an impact strength of at least 2.0 ft./lb./in. as measured by the ASTM test D256.

In a preferred embodiment of one application of these improved box materials, an extrusion of cellulose propionate or the like, or a tube formed therefrom, is held in place by a polystyrene cap having a connecting post projecting through the center of the flashcube and sealed ultrasonically to the top of a polystyrene base. Suitable means, such as steps, mating projections, lips, channels or the like are provided to firmly retain the transparent sidewall portions of the flashcube in position between the cap and the base. The post portion of the structure can be molded as part of the cover or base or divided between the two; however, the preferred form would probably be as a part of the cap since this would be the simplest to mold.

Figure 2:
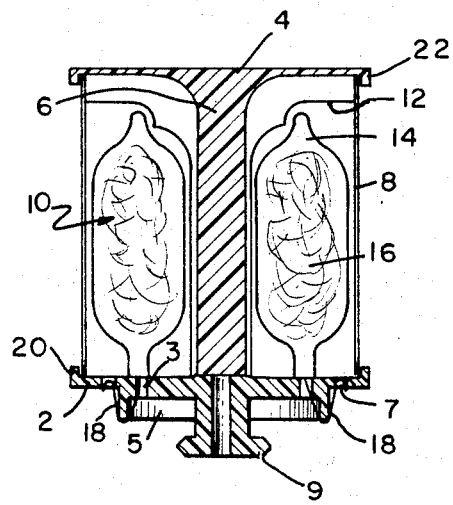

In a specific embodiment of the invention illustrated in the accompanying drawing, FIGURE 1 is a perspective view of a flashcube constructed in accordance with the principles of the invention and FIGURE 2 is a side elevational view in section of the flashcube of FIGURE 1.

The flashcube illustrated in the accompanying drawing comprises a polystyrene base 2, a polystyrene cap 4 with depending post 6 and a tube of transparent cellulose propionate 8 held between base 2 and cap 4. Disposed within the container defined by the structure just described are four flashlamps 10, each having its own reflector 12. Each flashlamp 10 comprises an hermetically sealed, light-transmitting envelope 14 have a filling of a combination-supporting gas at a pressure of at least about nine atmospheres pressure and a filling of shredded zirconium foil 16. Each flashlamp 10 is mounted on base 2 and attached thereto by the lamp lead-in wires 18. Each lead-in wire 18 is threaded through an aperture 3 provided therefor in base 2, shaped over the ring portion 5 of base 2 and finally anchored in aperture 7 in base 2. The base 2 is also provided with a depending post 9 for engagement with a suitable cooperating member on a camera on which the flashcube is mounted. The tube 8 which defines the transparent sides of the flashcube is held in place between the base 2 and the cap 4 by the rims 20 and 22 of the base and cap respectively. The polystyrene post 6 is sealed ultrasonically to the polystyrene base 2.

Tests under extremely severe testing conditions show the significant superiority of the cellulosic plastics over the polystyrene material even though they have thinner walls than the polystyrene boxes. The resistance of cellulose acetate and propionate boxes is far beyond their expected strength and, for all practical purposes, these materials provide a complete protection against shattering of the flashcube either by explosion of one or all four lamps, or by an accidental mechanical impact.

Photoflash lamps are normally provided with an exterior, protective lacquer coating. When lamps have a gas fill pressure of many atmospheres, usually several layers of protective coating are applied. In these tests, a single thin coating and in some instances no coating at all or a scratched coating was used on lamps having a gas fill pressure of about nine atmospheres. Such lamps will not contain the combustion heat and gas pressure, and will fail to various degrees. Some failures are called "puff-outs" and others "explosion."

A puff-out is an envelope which has a hole cracked or melted through the wall, releasing hot gases with a moderate noise. An explosion is a failure of the lamp envelope accompanied by a loud noise, flying glass chips and combustion products. Usually part or the whole glass envelope is shattered, depending upon the severity of the explosion. In these tests, a high percentage of flashcubes having polystyrene boxes or covers were damaged when the uncoated lamps were flashed whereas a very small, insignificant number of flashcubes made in accordance with the teaching of this invention were damaged under these severe test conditions.

One of the main advantages of the construction of this invention is that the improved sidewall materials can be employed while still retaining the speed and simplicity of ultrasonic sealing necessary for high speed production. The use of materials such as cellulose acetate and cellulose propionate offer the advantages of impact resistance to dropping and the toughness to contain exploding lamps. In addition, more room is available inside the flashcube since no taper is required as is the case with injection molded covers which have integral tops. A small increase in reflector diameter and depth can increase the amount of usable light from the lamps.

While there has been shown and described what is at present considered the preferred embodiment of the invention, it will be obvious to those skilled in the art that various changes and modifications may be made therein

What we claim is:

1. A photographic flashlamp unit comprising: a base; a plurality of reflectors arranged on said base; a plurality of flashlamps mounted on said base, each flashlamp being disposed in cooperative relationship with respect to one of said reflectors; a cap having a central depending post mounted on said base; and a sleeve of a transparent plastic material encompassing said flashlamps and their associated reflectors, said sleeve being supported between said base and said cap.

2. The combination of claim 1 in which the sleeve is of cellulosic polymer material.

3. The combination of claim 1 in which the sleeve of transparent plastic material is selected from the group consisting of cellulose propionate, cellulose acetate and cellulose butyrate.

4. The combination of claim 1 in which the sleeve of transparent plastic material is cellulose acetate.

5. The combination of claim 1 in which the sleeve of transparent plastic material is cellulose propionate.

6. The combination of claim 1 in which the base and the depending post are of the same material.

7. The combination of claim 1 in which the base and the depending post are of polystyrene material.

8. The combination of claim 1 in which the cap and base are provided with cooperating means for supporting the sleeve therebetween.

References Cited

UNITED STATES PATENTS

| | | | |
|---|---|---|---|
| 2,274,196 | 2/1942 | Gilbert | 206—45.34 XR |
| 3,327,105 | 6/1967 | Kottler et al. | 240—1.3 |
| 3,350,551 | 10/1967 | Whitehead | 240—1.3 |

NORTON ANSHER, *Primary Examiner.*

FRED L. BRAUN, *Assistant Examiner.*